Figure 2:
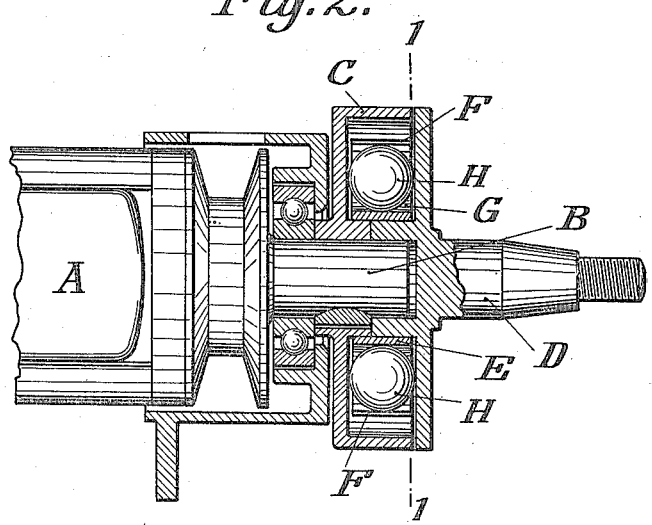

G. HONOLD.
APPARATUS FOR ADJUSTING THE PERIOD OF ELECTRICAL IGNITION.
APPLICATION FILED JULY 1, 1912.

1,221,326.

Patented Apr. 3, 1917.

WITNESSES
Minerva Lobel
Carolyn B. Schroeder

INVENTOR
Gottlob Honold
By Pennie, Davis & Goldsborough
Attys

UNITED STATES PATENT OFFICE.

GOTTLOB HONOLD, OF STUTTGART, GERMANY, ASSIGNOR TO THE FIRM OF ROBERT BOSCH, OF STUTTGART, GERMANY.

APPARATUS FOR ADJUSTING THE PERIOD OF ELECTRICAL IGNITION.

1,221,326.  Specification of Letters Patent.  Patented Apr. 3, 1917.

Application filed July 1, 1912. Serial No. 706,866.

*To all whom it may concern:*

Be it known that I, GOTTLOB HONOLD, engineer, a subject of the German Emperor, residing at 11-13 Hoppenlaustrasse, Stuttgart, Germany, have invented certain new and useful Improvements in Apparatus for Adjusting the Period of Electrical Ignition; and I do hereby declare the following to be a full, clear, and exact description of the invention, such as will enable others skilled in the art to which it appertains to make and use the same.

The present invention relates to apparatus for adjusting the period of ignition of electrical ignition apparatus relatively to the stroke of the internal combustion engine associated with it, and more particularly to apparatus of this kind wherein the adjustment is brought about by the centrifugal action in rotating masses tending to angularly displace the driving and driven shafts in such manner as to advance the ignition period as the speed of the engine increases.

The idea embodied in this invention has resulted from the observation that two telescoped drums may be angularly displaced with respect to each other by connecting them with a spirally guided draft element, such as a band. When this driving drum is turned, the band winds itself upon the inner drum until its slack is taken up, whereupon the driven drum is then pulled around. Now if the band is pressed outwardly at any point, the driven member angularly advances relatively to the driving member in proportion to the deformation of the band. If the band is made of springy material, such as clock-spring steel, it can be dimensioned and tensioned so as to return the two drums to their original angular relation when rotation ceases. The spring band may be pressed outwardly by rotating masses responsive to centrifugal force, and thereby the angular adjustment may be made automatic.

In accordance with this invention, the application of the above illustrative idea is embodied in an apparatus for adjusting the period of electric ignition for internal combustion engines. In the preferred construction for this purpose telescoped clutch members are connected with a spirally arranged spring against which radially guided rotating weights press in response to centrifugal action. In this way, the weights press the spring outwardly to advance the driven clutch member relatively to the driving clutch member upon an increase of speed, while the spring forces the weights inwardly to bring about the reverse shifting action upon decrease of speed.

Figure 1:
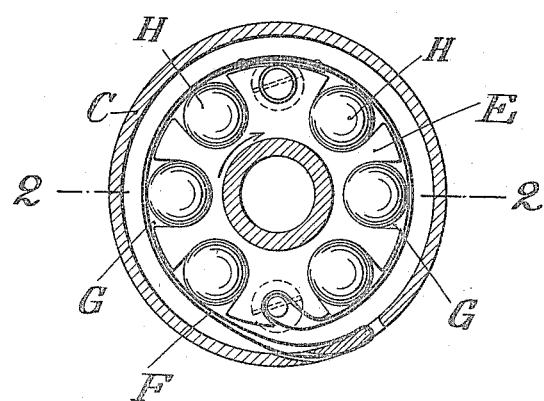

In the accompanying drawings illustrating the preferred embodiment of my invention, Figure 1 is a cross-section on line 1—1 of Fig. 2; and Fig. 2 is a longitudinal section on line 2—2 of Fig. 1.

The rotatable armature A of a magneto ignition machine is provided with a shaft B on which is splined a cup C forming the driven clutch member. The axially abutting driving shaft D is actuated by the internal combustion engine in any suitable way (not shown). On the shaft D is splined an inner clutch member E whose outer diameter is sufficiently less than the inner diameter of the surrounding cup C as to provide an annular space between them. The flat spring-band F is spirally arranged in this annular space and is attached to the two clutch members as shown. The radial guides G receive the metal balls H which are free to press the spring F outwardly in response to centrifugal action.

The spring F is so dimensioned and tensioned as to conform to the circumference of the inner member E when the apparatus is at rest, this position corresponding to extreme retarded ignition. As the driving shaft D speeds up, the balls H move outwardly against the stress of the spring F and expand it in proportion to the speed, whereby the driven shaft B is angularly advanced relatively to the driving shaft D, the direction of rotation being indicated by the arrow in Fig. 1. In this way, the period of ignition of the igniton machines is advanced relatively to the stroke of the engine in proportion to the speed. The extreme advanced ignition occurs when the spring F is pressed against the inner wall of the clutch member C. Upon decrease of speed, the spring F forces the balls inwardly and thereby allows the driven shaft B to fall behind the driving shaft D.

Having thus described my invention, what I claim is:

1. Apparatus for adjusting the period of electrical ignition for an internal combustion engine, comprising a rotatable member having radial guides, a coöperative member surrounding the other member, a spirally arranged spring attached to both members, and weights in said guides arranged to press against the spring in response to centrifugal action to angularly displace the members upon variation of speed.

2. The combination with a magneto electric generator having a rotatable shaft, of apparatus for adjusting the ignition period of the generator, comprising a rotatable driving member having radial guides, a coöperative driven member surrounding the other member and fastened on the generator shaft, a spirally arranged spring attached to both members, and metal balls in said guides arranged to press the spring outwardly in response to centrifugal action to angularly advance the driven member relatively to the driving member upon increase of speed.

In testimony whereof I affix my signature, in presence of two witnesses.

GOTTLOB HONOLD.

Witnesses:
GUSTAV MAIER,
PAUL WOLFAST.

Copies of this patent may be obtained for five cents each, by addressing the "Commissioner of Patents, Washington, D. C."